United States Patent
Johnson et al.

(10) Patent No.: US 11,154,919 B2
(45) Date of Patent: Oct. 26, 2021

(54) PLANETARY REFORM ROLLER AND METHOD OF REFORMING A VESSEL CAVITY

(71) Applicant: Titanium Metals Corporation, Henderson, NV (US)

(72) Inventors: Greg Johnson, Henderson, NV (US); Kaveh Golestaneh, Henderson, NV (US)

(73) Assignee: Titanium Metals Corporation, Henderson, NV (US)

( * ) Notice: Subject to any disclaimer, the term of this patent is extended or adjusted under 35 U.S.C. 154(b) by 228 days.

(21) Appl. No.: 16/036,850

(22) Filed: Jul. 16, 2018

(65) Prior Publication Data

US 2019/0015882 A1 Jan. 17, 2019

Related U.S. Application Data

(60) Provisional application No. 62/533,570, filed on Jul. 17, 2017.

(51) Int. Cl.
*B21B 13/20* (2006.01)
*B21B 1/42* (2006.01)
(Continued)

(52) U.S. Cl.
CPC ............ *B21B 13/20* (2013.01); *B21B 1/42* (2013.01); *B24B 5/40* (2013.01); *B24B 27/0076* (2013.01);
(Continued)

(58) Field of Classification Search
CPC ....... B24B 33/02; B24B 33/00; B24B 33/022; B24B 33/027; B24B 33/025; B24B 33/08;
(Continued)

(56) References Cited

U.S. PATENT DOCUMENTS

| | | | | | |
|---|---|---|---|---|---|
| 1,114,376 | A | * | 10/1914 | Milkop | B24B 23/08 |
| | | | | | 451/440 |
| 1,803,701 | A | * | 5/1931 | Grover | B24B 33/08 |
| | | | | | 451/479 |

(Continued)

FOREIGN PATENT DOCUMENTS

| | | |
|---|---|---|
| GB | 842332 | 7/1960 |
| GB | 842332 A * | 7/1960 |

(Continued)

OTHER PUBLICATIONS

International Search Report for international application PCT/US2018/042432, dated Oct. 2, 2018.

(Continued)

*Primary Examiner* — Teresa M Ekiert
*Assistant Examiner* — Sarkis A Aktavoukian
(74) *Attorney, Agent, or Firm* — Burris Law, PLLC (57) ABSTRACT

A device for reforming a vessel cavity is provided that includes a central shaft, a central gear coupled to the central shaft, and a plurality of roller gears coupled to the central gear, with each of the plurality of roller gears having a central portion. A proximal support member couples the plurality of roller gears and at least one of the central gear and the central shaft. A plurality of rollers is also provided, each of the plurality of rollers connected to the central portion of each of the plurality of roller gears. In one form, at least one idler member is disposed between the plurality of rollers. A distal support member couples the plurality of rollers and at least one of the central gear and a translation member. Also, a stationary member is secured to a distal portion of the vessel cavity.

20 Claims, 9 Drawing Sheets

(51) Int. Cl.
    *B24B 39/02*     (2006.01)
    *B24D 5/14*     (2006.01)
    *B24B 5/40*     (2006.01)
    *B24B 27/00*     (2006.01)
    *F16H 1/28*     (2006.01)

(52) U.S. Cl.
    CPC .............. *B24B 39/023* (2013.01); *B24D 5/14* (2013.01); *F16H 1/28* (2013.01)

(58) Field of Classification Search
    CPC .. B24B 5/40; B24B 5/06; B24B 29/04; B24B 53/017; B24B 53/04; B24B 27/0076; B24B 27/0061; B24B 39/023; B24B 39/003; B24B 39/045; B24B 39/02; B21B 1/42; B21B 27/005; B24D 15/00; B24D 7/18; B24D 15/02; B21H 7/14; B21H 8/005; B21H 8/02; B23P 9/025
    USPC ............................. 451/462, 461, 65, 57, 51
    See application file for complete search history.

(56) References Cited

U.S. PATENT DOCUMENTS

| | | | |
|---|---|---|---|
| 2,174,803 A | | 10/1939 | Mundt et al. |
| 2,791,871 A | * | 5/1957 | Johnson .................. B24B 33/06 451/478 |
| 3,330,078 A | * | 7/1967 | Von Tersch ........... B24B 33/084 451/484 |
| 3,435,479 A | * | 4/1969 | Gibson, Sr. ............ B24D 13/10 15/104.04 |
| 3,548,548 A | * | 12/1970 | Held ....................... B24B 33/08 451/211 |
| 3,678,630 A | * | 7/1972 | Borcherding ........... B24B 33/00 451/163 |
| 4,592,173 A | * | 6/1986 | White, Jr. ............. B24B 33/027 451/157 |
| 4,707,944 A | * | 11/1987 | Parsons ................. B24B 33/022 451/140 |
| 2010/0240284 A1 | * | 9/2010 | Lin ......................... B24B 53/12 451/51 |

FOREIGN PATENT DOCUMENTS

| | | |
|---|---|---|
| JP | S5879162 | 5/1983 |
| SU | 349573 | 9/1972 |
| SU | 463537 | 3/1975 |
| SU | 707785 | 1/1980 |
| SU | 841937 | 6/1981 |
| SU | 1581566 | 7/1990 |
| SU | 1706847 | 1/1992 |
| SU | 1785882 | 1/1993 |

OTHER PUBLICATIONS

Office Action issued in corresponding Russian Application No. 2020106796, dated Jul. 30, 2020.
Office Action issued in corresponding CN Application No. 201880047961.4, dated Dec. 30, 2020.

* cited by examiner

PLANETARY REFORM ROLLER AND METHOD OF REFORMING A VESSEL CAVITY

CROSS-REFERENCE TO RELATED APPLICATIONS

This application claims priority to and the benefit of U.S. Provisional Application Ser. No. 62/533,570 filed on Jul. 17, 2017, the entirety of which is incorporated herein by reference.

FIELD

The present disclosure relates to reforming or straightening of cavities in pipes, tanks, tubes, vessels, and other objects having an internal cavity or passageway.

BACKGROUND

The statements in this section merely provide background information related to the present disclosure and may not constitute prior art.

Foundries create ingots of material for ease of transport, storage and other logistical requirements. Ingots are generally cast within metallic vessel cavities, and the casting vessels are used for multiple ingot castings. Throughout their lifecycle, casting vessels are eventually deformed by the molten materials of the casting. Casting vessels may also be deformed when the ingot is removed from the casting vessel.

Historically, casting vessels have been reformed by heating the casting vessel in a furnace and then using a hydraulic reforming device or hydraulic press to slowly push the cylinder walls out from the inside. This hot reforming process is costly and e consuming. For example, on average, reforming a casting vessel can take up to twelve hours and thus causes significant production downtime.

Issues related to reforming casting vessels, among other plastically deformable objects such as pipes, tubes, and tanks, is addressed by the present disclosure.

SUMMARY

In one form of the present disclosure, a device for reforming a vessel cavity is provided. The device comprises a central shaft, a central gear coupled to the central shaft, a plurality of roller gears coupled to the central gear, each of the plurality of roller gears having a central portion. The device further includes a proximal support member coupling the plurality of roller gears and at least one of the central gear and the central shaft. A plurality of rollers is connected to the central portion of each of the plurality of roller gears. Further, the device has a distal support member coupling the plurality of rollers and at least one of the central gear and a translation member. The translation member is configured to engage a stationary member secured to a distal portion of the vessel cavity and functions to move the device through the vessel cavity as the device is rotated.

In variations of this device, the central shaft engages the stationary member and is operable to move the device distally and proximally through the vessel cavity. In another form, a ram is configured to engage and move the device distally and proximally through the vessel cavity. At least one roller of the plurality of rollers has a shape that is at least one of curved, segmented, straight, and tapered. The central gear is smaller than the plurality of roller gears such that a gear reduction occurs between the central gear and the plurality of roller gears. In another variation, at least one stabilizer is coupled between the distal support member and the proximal support member. In another form, the device further comprises at least one idler member disposed between the plurality of rollers and the idler member defines a peripheral surface adapted to engage the plurality of rollers, the peripheral surface defining at least one of an arcuate surface, a B-surface, a polygonal surface, and a planar surface. A driver may be configured to pre-load the idler member against the plurality of rollers, wherein the driver is selected from the group consisting of a hydraulic ram and a spring. Further, at least one roller of the plurality of rollers further comprises at least one of a deburring segment, a buffing segment, a polishing segment, and combinations thereof. In still another variation, at least one roller of the plurality of rollers defines a surface having at least one of a helical ridge, a helical groove, a concentric ridge, concentric grooves, a smooth surface, and combinations thereof.

In another form of the present disclosure, a method of reforming a vessel cavity is provided that comprises positioning the device described above proximate the vessel cavity and engaging the translation member with the stationary member of the vessel, engaging the central shaft, and moving the device through the vessel cavity. In one form, the device is moved through rotation. In another form, a driver is engaged to move the device through the vessel cavity, and the driver may be a ram, among other driving means.

In another form of the present disclosure, a method of reforming a vessel cavity is provided that comprises positioning a plurality of rollers proximate an opening of the vessel cavity and engaging the plurality of rollers with a rotational driving mechanism and a translational driving mechanism. The translational driving mechanism progressively moves the plurality of rollers through the vessel cavity while simultaneously rotating the plurality of rollers with the rotational driving mechanism such that internal walls of the vessel cavity are reformed. In at least one form, the engagement of the plurality of rollers with the internals walls of the vessel cavity is maintained throughout translation of the plurality of rollers. In yet another form, movement of the plurality of rollers distally and proximally through the vessel cavity is repeated.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. Throughout the drawings, corresponding reference numerals indicate like or corresponding parts and features. It should also be understood that steps within a method may be executed in different order without altering the principles of the present disclosure.

Figure 1:
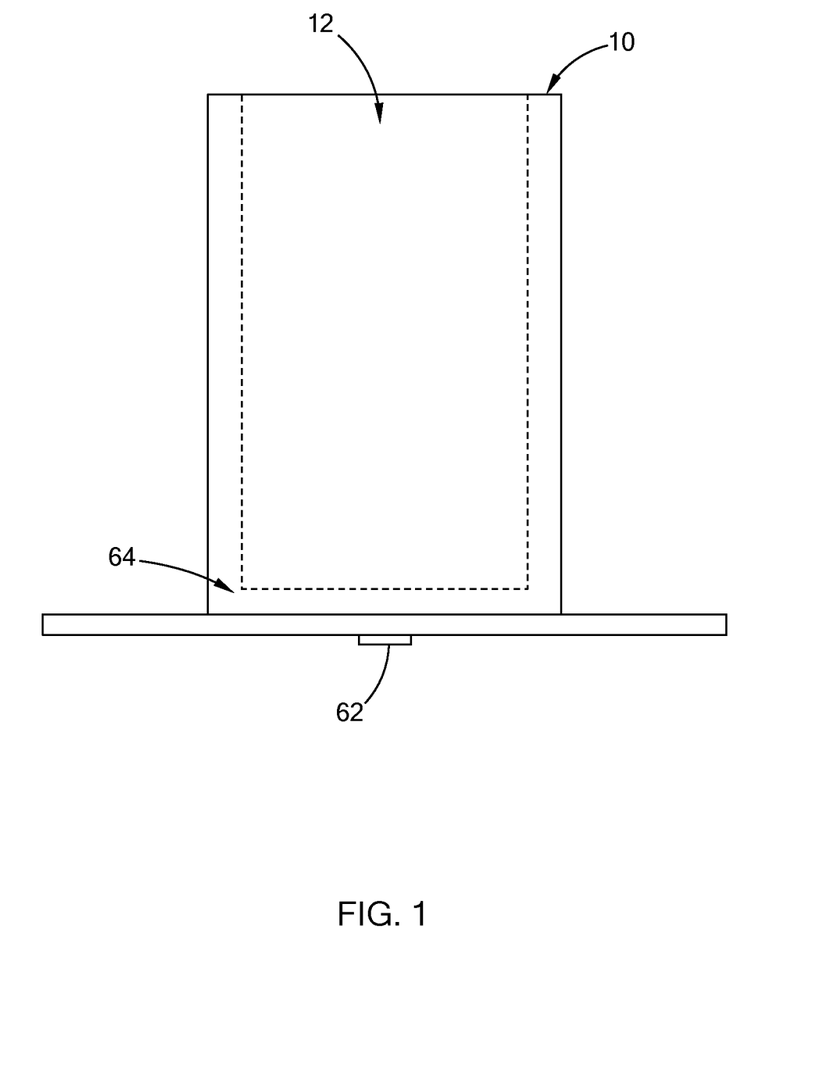
FIG. 1 is a side view of an exemplary casting vessel that is reformed according to the teachings of the present disclosure.

Referring to FIG. 1, an exemplary casting vessel 10 to which the teachings of the present disclosure are applied generally comprises a vessel cavity 12 into which molten metal is poured during casting operations. After repeated casting operations, this vessel cavity 12 becomes distorted and eventually requires reworking in order to bring the vessel cavity 12 back to within specifications of its original geometry. It should be understood that the teachings of the present disclosure are applicable to a variety of objects having a cavity such as pipes, tanks, and tubes, among others. Therefore, a casting vessel 10 should not be construed as limiting the scope of the present disclosure.

Figure 2:
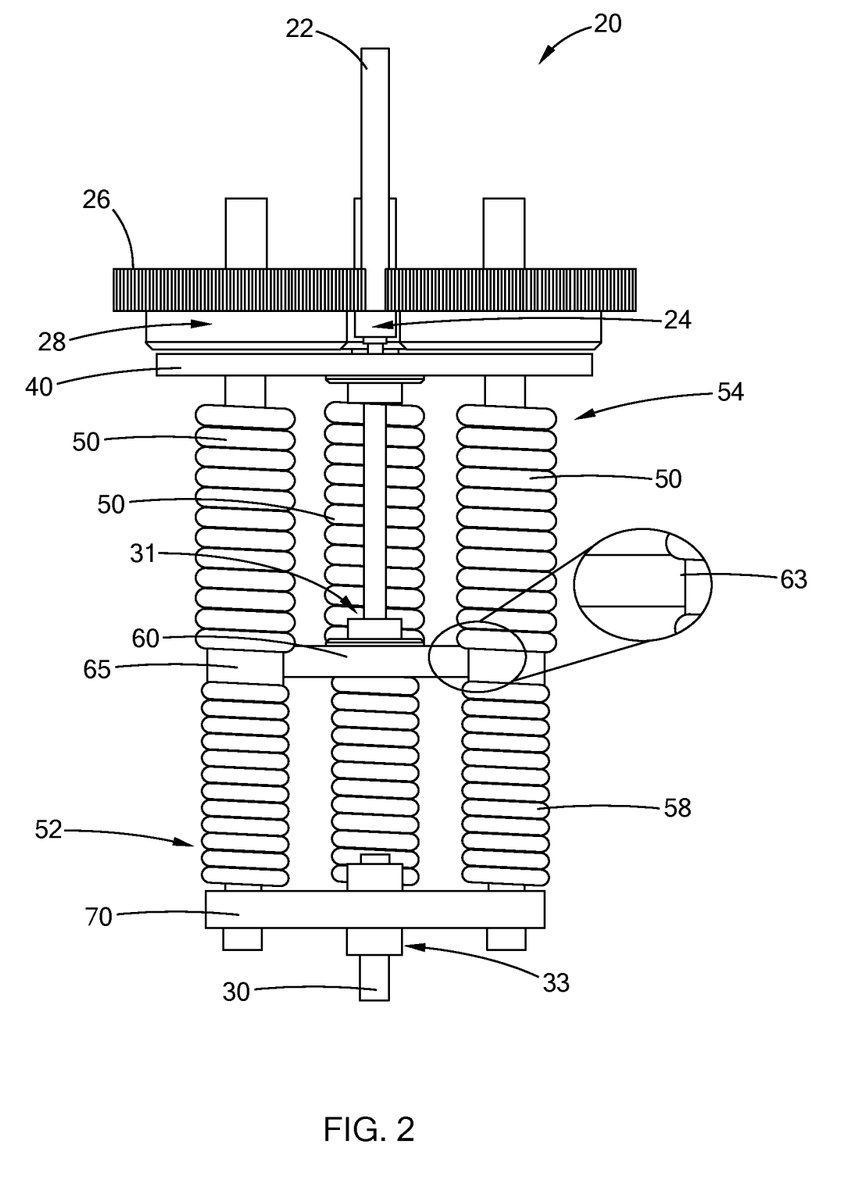
FIG. 2 is a side view of one form of a device for reforming a vessel cavity constructed according to the teachings of the present disclosure.
Figure 3:
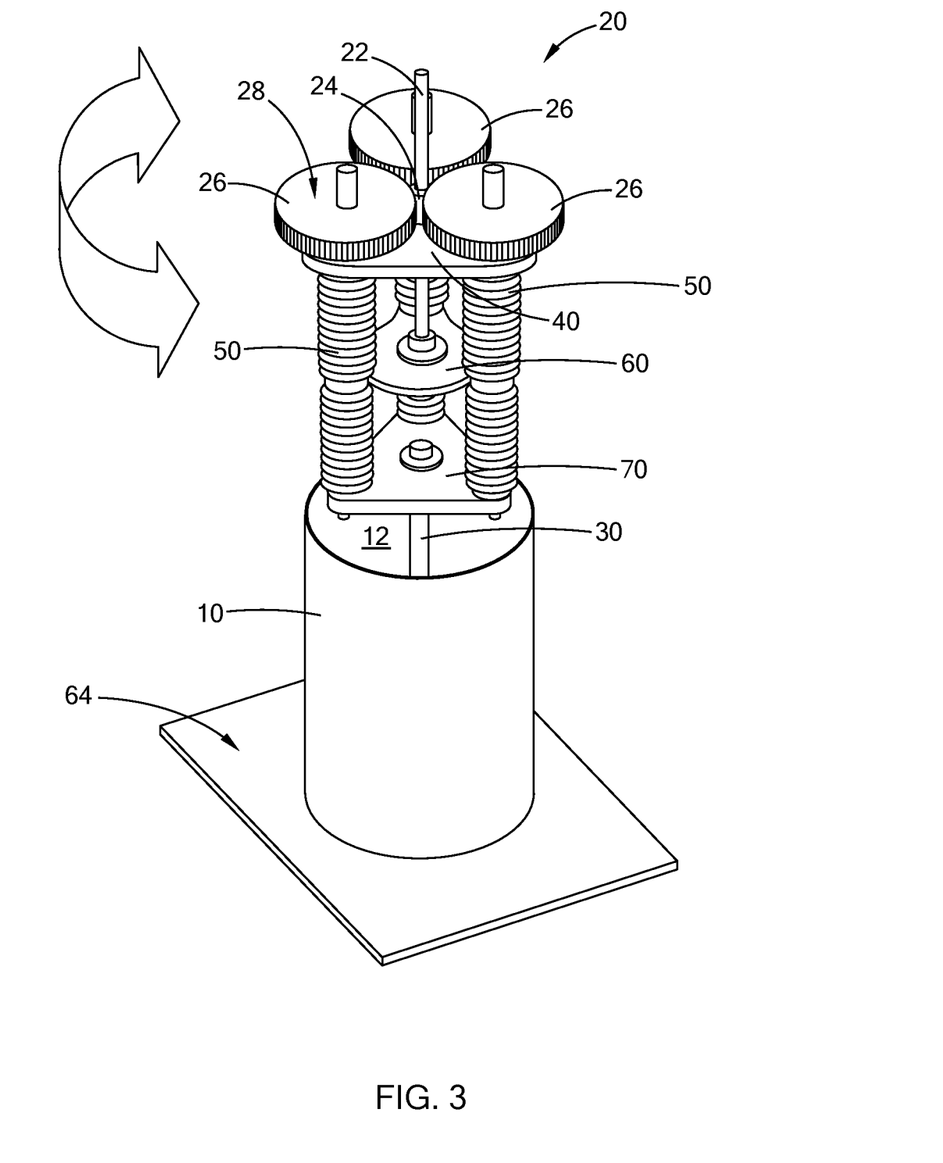
FIG. 3 is a perspective view of the device of FIG. 2 configured to rotate and disposed above the exemplary casting vessel according to the teachings of the present disclosure.
Figure 4:
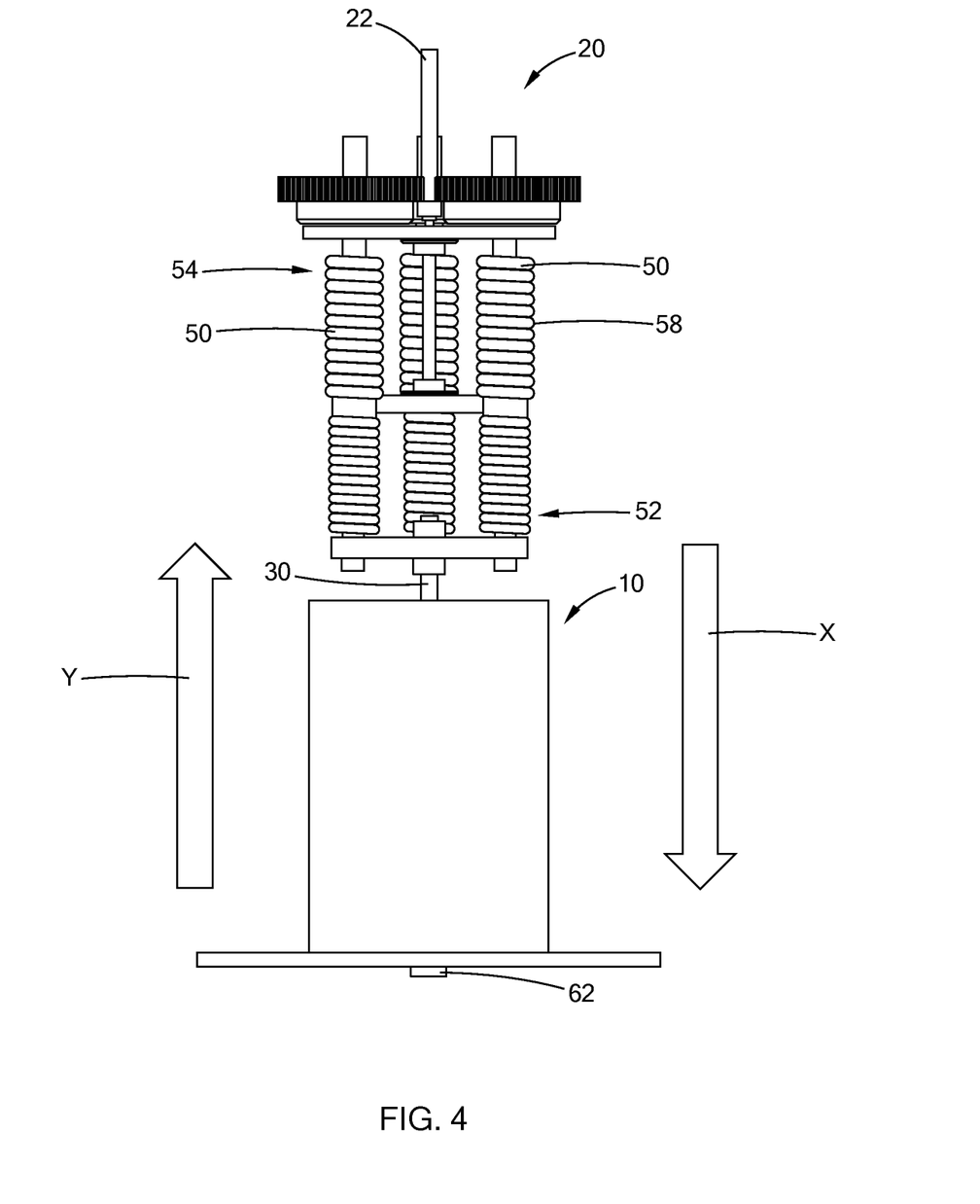
FIG. 4 is a side view of the device of FIG. 2 positioned proximate a vessel cavity according to the teachings of the present disclosure.

Referring now to FIGS. 2 to 4, one form of the present disclosure includes a device for reforming the vessel cavity 12, which is illustrated and generally indicated by reference numeral 20. The device 20 comprises a central shaft 22, a central gear 24 coupled to the central shaft 22, and a plurality of roller gears 26 coupled to the central gear 24, wherein each roller gear 26 has a central portion 28. Generally, the central gear 24 is smaller than each of roller gears 26 such that a gear reduction occurs between the central gear 24 and the roller gears 26.

The device 20 also includes a proximal support member 40 coupling the plurality of roller gears 26, the central gear 24, and the central shaft 22. More specifically, the proximal support member 40 includes a plurality of apertures through which the central shaft 22 extends, and to which the roller gears 26 and the central gear 24 are mounted.

As further shown, the device 20 includes a plurality of rollers 50, with each of the rollers 50 connected to the central portion 28 of each of the plurality of roller gears 26. In this form, a total of three (3) rollers 50 are employed, however, it should be understood that any number of rollers 50 may be employed while remaining within the scope of the present disclosure. The device 20 also includes at least one idler member 60 disposed between the plurality of rollers 50, and a distal support member 70 coupling the plurality of rollers 50 and a translation member 30. Further, a stationary member 62 (shown in FIGS. 1 and 4) is secured to a distal portion 64 of the vessel cavity 12. The idler member 60 generally functions to separate and stabilize each of the rollers 50 and is described in greater detail below. The translation member 30 in one form is secured to the device 20 at a proximal end portion 31 and engages the stationary member 62 at a distal end portion 33 (best shown in FIG. 5C). The translation member 30 functions to move the device 20 through the vessel cavity 12 as the device 20 is rotated, as described in greater detail below.

Each of the rollers 50 has a shape that is tapered in a distal direction such that an overall peripheral dimension at a lower portion 52 of each roller 50 is smaller than an overall peripheral dimension at an upper portion 54 of each roller 50. With this tapered configuration, the rollers 50 may more easily be moved through the vessel cavity and gradually reform the walls of the vessel cavity 12 as described in greater detail below. The rollers 50 in this form are also round as shown. In alternate forms not shown, the rollers 50 may take on other shapes such as curved, segmented, and straight, among others, while remaining within the teachings of the present disclosure.

Each of the rollers 50 has a surface that includes helical ridges 58 as shown. These helical ridges 58 are configured to reform the vessel cavity 12 as the device 20 and rollers 50 are moved through the vessel cavity 12. Alternate surfaces for the rollers 50 may also be employed, such as by way of example helical grooves, concentric ridges, concentric grooves, smooth surfaces, and combinations thereof. In this form, each roller 50 is a single component having its helical ridges 58 machined into the outer surface. However, it should be understood that the rollers 50 may include individual rollers mounted to a shaft while remaining within the scope of the present disclosure. The rollers 50 in one form are made from a hard tool steel. Generally, the surfaces of the rollers 50, along with their tapered configuration, are used to progressively reform the vessel cavity 12 as the device 20 is moved therethrough, as described in greater detail below.

Referring specifically to FIG. 4, the translation member 30 engages the stationary member 62, and in this form with a threaded engagement where the translation member 30 is externally threaded and the stationary member 62 is internally threaded (e.g., a nut). This engagement between the translation member 30 and the stationary member 62 is operable to move the device 20 distally and proximally through the vessel cavity 12, where distally is indicated by the direction of arrow X, and proximally is indicated by arrow Y. More specifically, as the central shaft 22 is rotated, the threads (not shown) of the translation member 30 progressively engage the threads (not shown) of the stationary member 62, thereby moving the entire device 20 distally into the vessel cavity 12. When the central shaft 22 is rotated in an opposite direction, the entire device 20 is moved proximally out of the vessel cavity 12, which is described in greater detail below. In an alternate form, the device 20 further may include a ram (not shown) to engage and move the device 20 through the vessel cavity 12. This ram may be used as an alternative to the translation member 30 engaging the stationary member 62.

As further shown in FIG. 2, the idler member 60 defines a peripheral surface adapted to engage the plurality of rollers 50. This peripheral surface 63 as shown is arcuate or curved, which engages a corresponding groove 65 positioned approximately mid-way down a length of each roller 50.

Generally, the idler member 60 stabilizes the rollers 50 as they traverse the vessel cavity 12. In alternate forms, the peripheral surface 63 may be another shape besides arcuate, such as by way of example, a B-surface, a polygonal surface, and a planar surface, among others. As the device 20 traverses and reforms the vessel cavity 12, the idler member 60 stabilizes, resists inward pressure from the cavity walls, and enables the rollers 50 to maintain contact/pressure against the walls of the vessel cavity 12. Maintaining engagement of the rollers 50 with the vessel cavity 12 improves reforming speed and effectiveness of the device 20.

Figure 5A:
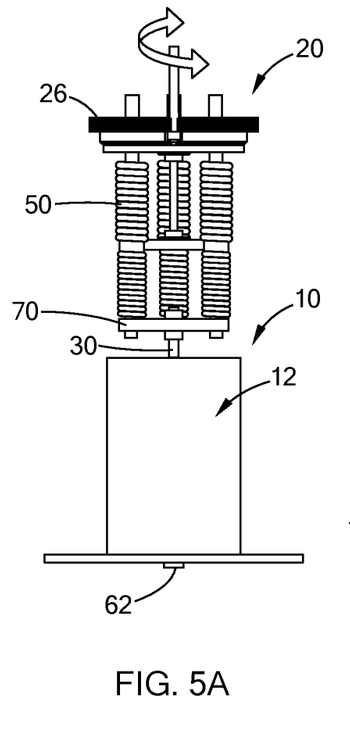
FIGS. 5A-5C are side views of the device of FIG. 2 as the device is progressively moved through a vessel cavity according to the teachings of the present disclosure.
Figure 5B:
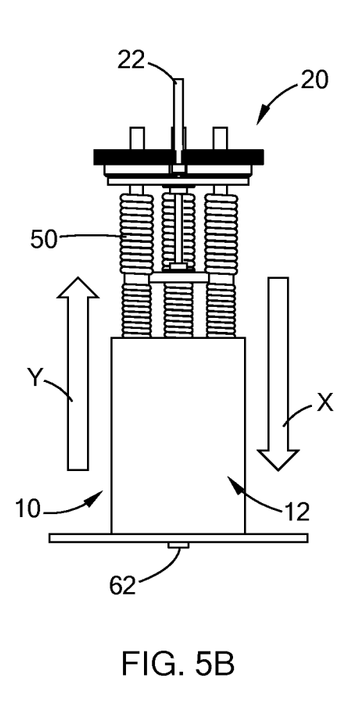
Figure 5C:
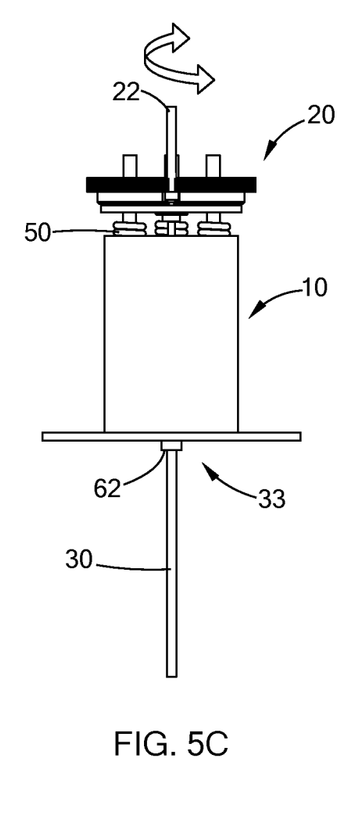

Referring to FIGS. 5A through 5C, movement of the device 20 distally through the vessel cavity is illustrated and now described in greater detail. As shown, the device 20 is positioned above the vessel 10 and the vessel cavity 12. The translation member 30 is engaged with the stationary member 62 such that the device is operatively engaged with the vessel 10. As the central shaft 22 is rotated (either clockwise or counterclockwise, depending on the thread directions), the central gear 24 rotates and engages each of the roller gears 26. As each of the roller gears 26 rotate, each of the respective rollers 50 also rotate. Accordingly, the distal support member 70 may include internal bearings (not shown) that receive and allow each of the rollers 50 to rotate.

As the central shaft 22 continues to rotate, the entire device 20 is moved distally into the vessel cavity 12 due to the engagement between the translation member 30 and the stationary member 62. The helical ridges 58 of the rollers 50 progressively engage the internal wall of the vessel cavity 12, causing plastic deformation of the cavity walls and a reforming of the vessel cavity 12. This rotation continues until the device 20 is extended all the way into the vessel cavity 12 and each of the rollers 50 have plastically deformed the vessel cavity 12 in its entirety. To remove the device 20 from the vessel cavity 12, the central shaft 22 is rotated in an opposite direction, which causes the device 20 to move proximally and out of the vessel cavity 12. This operation may be repeated any number of times depending on the desired surface geometry within the vessel cavity 12. In this exemplary form, the central shaft 22 is rotated at about 850 RPM and the entire device 20 is moved proximally into and out of the vessel cavity 12 in about 2.5 minutes for a full reforming operation. It should be understood that other rotation speeds and times may be employed as a function of vessel characteristics such as size and materials.

In at least one variation of the present disclosure, the geometric configuration of at least one roller in the plurality of rollers enables the distal and/or proximal movement of the device through the vessel cavity without an external source that applies axial forces. For example, a driver that engages the rollers or roller gears rotates the rollers. At least one roller has a taper, a helical groove, and a deburring segment that, as they rotate, couple to the internal walls of the vessel cavity moving (pulling) the device distally into the vessel cavity.

Figure 6:
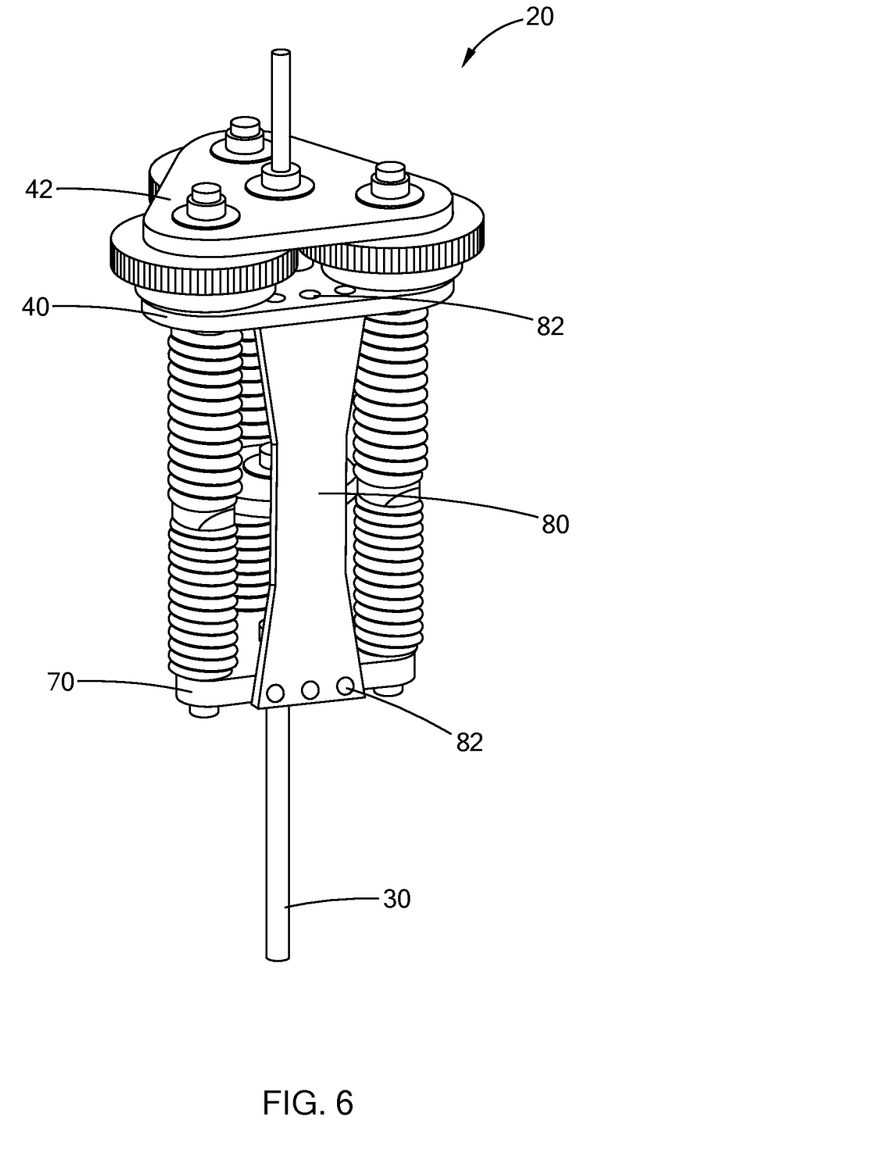
FIG. 6 is a perspective view of a form of the device of FIG. 2 having side supports constructed according to the teachings of the present disclosure.

Referring now to FIG. 6, in one form of the present disclosure, the device 20 further comprises at least one stabilizer 80 coupled between the distal support member 70 and the proximal support member 40. The stabilizer 80 resists twisting, or torsion, of the device 20 during the reforming process. In this form, three (3) stabilizers 80 are used, which are secured to each of the proximal support member 40 and the distal support member 70 with bolts 82 as shown. The stabilizer 80 is also positioned inwardly of the rollers 50 such that it does not interfere with the reforming operation, namely, contacting the walls of the vessel cavity 12. Additionally, the device 20 further comprises a second proximal support member 42 that also includes a plurality of apertures through which the central shaft 22 extends, and to which the roller gears 26 and the central gear 24 are mounted. The second proximal support member 42 is positioned with the roller gears 26 coupled between the proximal support member 40 and the second proximal support member 42.

Figure 7:
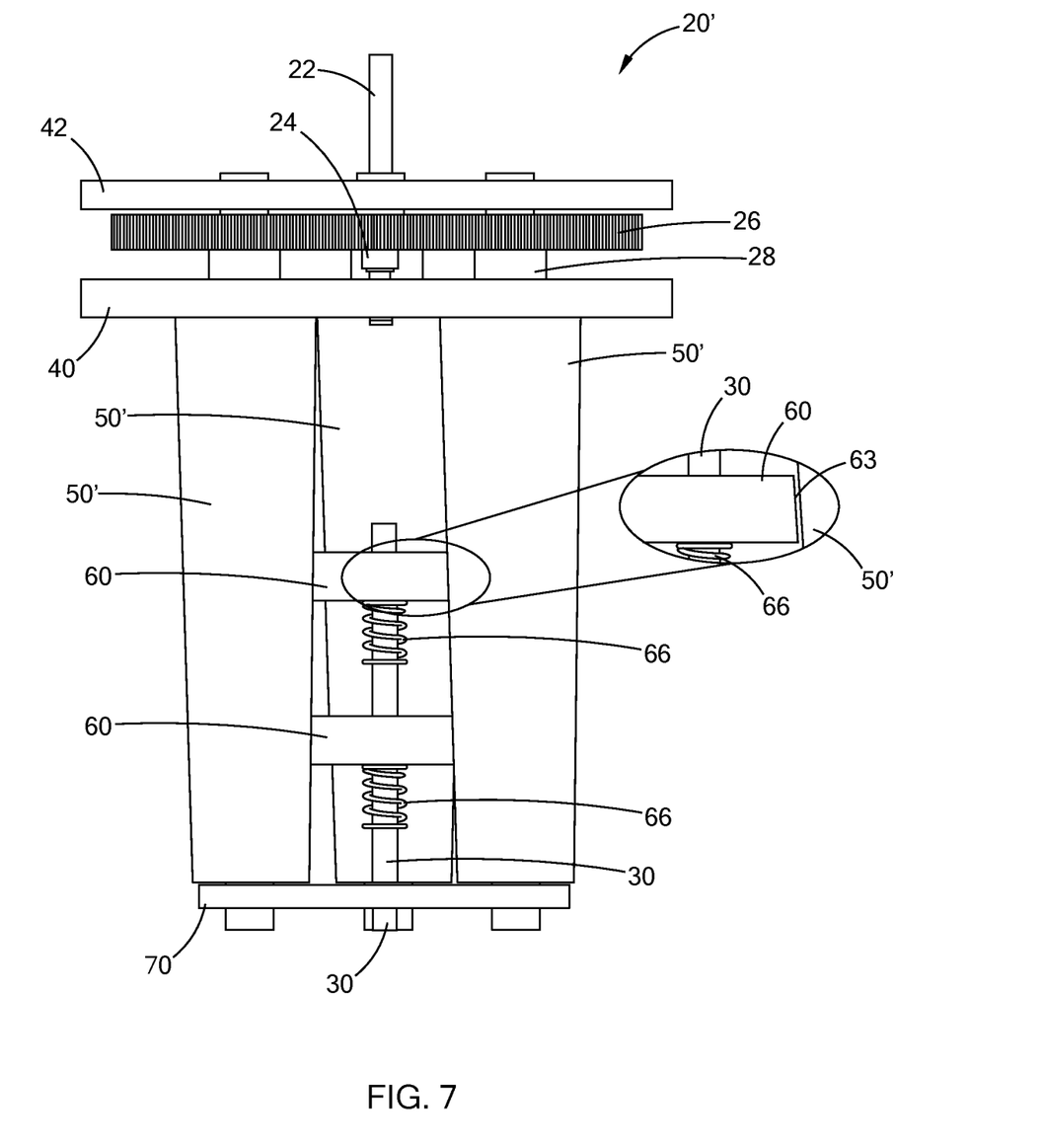
FIG. 7 is a side view of another form of a device for reforming a vessel cavity constructed according to the teachings of the present disclosure.

Referring now to FIG. 7, in another form of the present disclosure, the device 20' includes tapered rollers 50' having smooth outer surfaces. As shown, the device 20' further comprises a plurality of springs 66 and a plurality of idler members 60. Each of the idler members defines a peripheral surface 63 (shown in the detail view) that is tapered outwardly. Together with the springs 66, the tapered peripheral surfaces 63 are operable to pre-load idler members 60 against the plurality of rollers 50' and thus forcing the plurality of rollers 50' radially outward against the walls of the vessel cavity 12.

Figure 8:
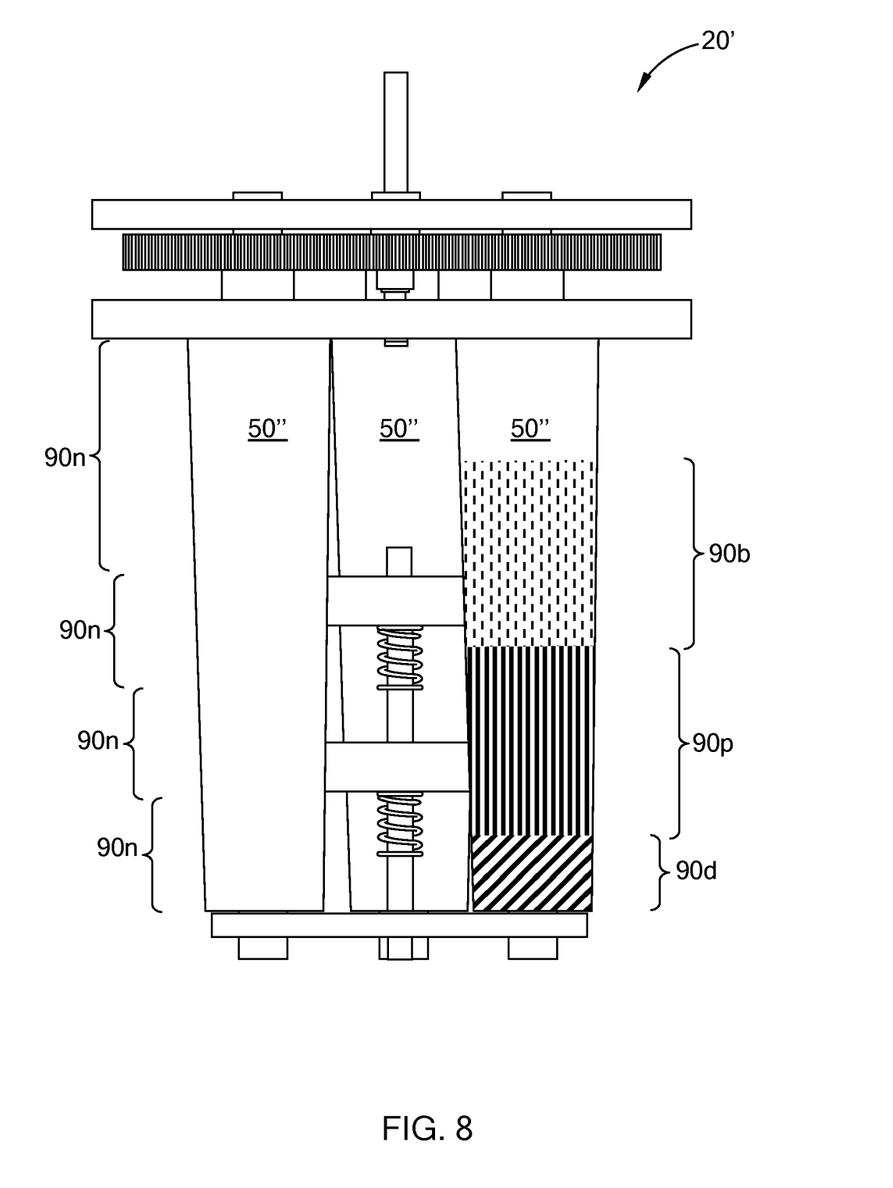
FIG. 8 is a side view of a variation of the device of FIG. 2, illustrating exemplary segments of rollers according to the teachings of the present disclosure.

Referring to FIG. 8, in another form of the present disclosure, at least one of rollers 50 may include an alternate surface configuration other than helical ridges 58 to perform other operations such as finishing after reforming. For example, the rollers 50 may comprise at least one of a deburring segment, a buffing segment, a polishing segment, and combinations thereof.

More specifically, the roller 50" comprises segments $90_n$. As shown, segment $90_d$ deburrs, segment $90_p$ polishes, segment $90_b$ buffs, and any one of the segments $90_n$ also shapes the internal walls of the vessel cavity. Further, some segments $90_n$ overlap, performing multiple reforming operations depending on the desired vessel cavity characteristics. Additionally, segments, shapes, and surfaces may be configured in any number of combinations, enabling a roller with, for example, a curved segmented surface with helical ridges that reshapes, deburrs, and polishes the vessel cavity. Although one roller with segments $90_d$, $90_p$, and $90_b$ along with one roller having a single reforming portion $90_n$ are shown, it should be understood that any combination of rollers and roller segments may be employed while remaining within the scope of the present disclosure.

While an idler member 60 is shown, an idler is an optional structure to enable the reforming process. For example, in one form with a ram to move the device distally and proximally through the vessel cavity, the driver rotating the rollers can stop moving and the reformer will still reform vessel cavity to some extent or exit when the reforming has completed.

Although a distal support member, an idler, and a proximal support member are shown, a distal (or proximal) support member that can structurally support the plurality of rollers to reform the vessel cavity without the idler should be considered to be within the teachings of the present disclosure. Similarly, a distal (or proximal) support member that can structurally support the plurality of rollers alone, in conjunction with the vessel cavity, is also within the teachings of the present disclosure.

Figure 9:
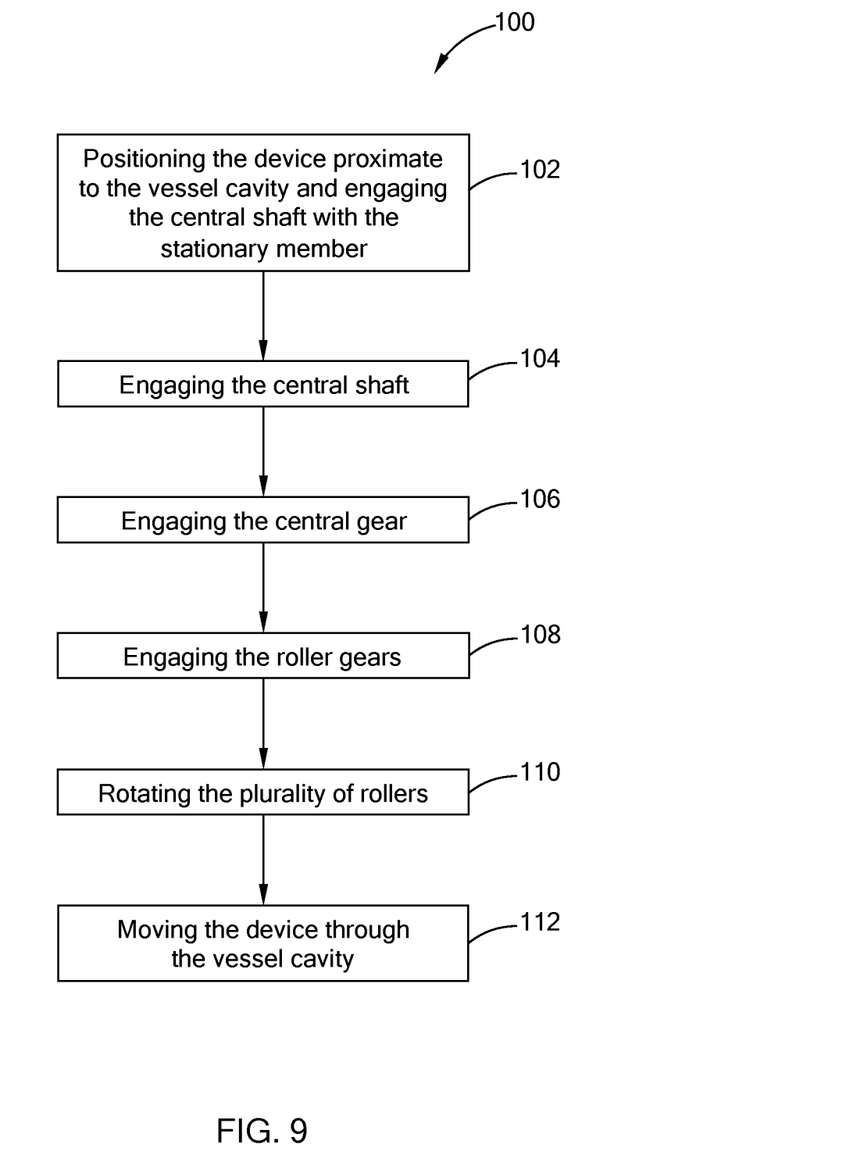
FIG. 9 is a flow diagram illustrating a method of reforming a vessel cavity according to the teachings of the present disclosure.

Referring now to FIG. 9, a method according to the present disclosure is illustrated in a flow diagram and represented by reference numeral 100. The method 100 comprises positioning the device proximate to the vessel cavity and engaging the central shaft with the stationary member in step 102. Next, the central shaft is engaged in step 104, which then leads to engaging the central gear in step 106, followed by engaging the roller gears in step 108, then rotating the plurality of rollers in step 110, and finally moving the device through the vessel cavity in step 112. It should be understood that these steps and their order are merely exemplary and other steps may be included consistent with the disclosure herein.

The vessel 10 is at room temperature during the reforming process, however, elevated temperatures may be used while remaining within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for reforming a vessel cavity comprising:
    a central shaft;
    a central gear coupled to the central shaft;
    a plurality of roller gears coupled to the central gear, each of the plurality of roller gears having a central portion;
    a proximal support member coupling the plurality of roller gears and at least one of the central gear and the central shaft;
    a plurality of rollers, each of the plurality of rollers being axially aligned with and connected to the central portion of each of the plurality of roller gears;
    a distal support member coupling the plurality of rollers and the central shaft; and
    a translation member secured to a distal portion of the vessel cavity, wherein the translation member is configured to move the device distally and proximally through the vessel cavity.

2. The device according to claim 1, further comprising a ram configured to engage and move the device distally and proximally through the vessel cavity.

3. The device according to claim 1, wherein at least one roller of the plurality of rollers has a shape that is at least one of curved, segmented, straight, and tapered.

4. The device according to claim 1, wherein the central gear is smaller than the plurality of roller gears such that a gear reduction occurs between the central gear and the plurality of roller gears.

5. The device according to claim 1 further comprising a second proximal support member.

6. The device according to claim 1 further comprising at least one stabilizer coupled between the distal support member and the proximal support member.

7. The device according to claim 1 further comprising at least one idler member disposed between the plurality of rollers.

8. The device according to claim 7, wherein the idler member defines a peripheral surface adapted to engage the plurality of rollers, the peripheral surface defining at least one of an arcuate surface, a B-surface, a polygonal surface, and a planar surface.

9. The device according to claim 7 further comprising a driver configured to pre-load the idler member against the plurality of rollers.

10. The device according to claim 9, wherein the driver is selected from the group consisting of a hydraulic ram and a spring.

11. The device according to claim 1, wherein at least one roller of the plurality of rollers further comprises at least one of a deburring segment, a buffing segment, a polishing segment, and combinations thereof.

12. The device according to claim 1, wherein at least one roller of the plurality of rollers defines a surface having at least one of a helical ridge, a helical groove, a concentric ridge, concentric grooves, a smooth surface, and combinations thereof.

13. The device according to claim 1, wherein each of the plurality of rollers defines a surface having helical ridges.

14. The device according to claim 1, further comprising a stationary member secured to the distal portion of the vessel cavity, wherein the translation member is secured to the distal portion of the vessel cavity via engagement with the stationary member.

15. A method of reforming the vessel cavity of claim 1, the method comprising:
    positioning the device of claim 1 proximate the vessel cavity;
    rotating the central shaft to rotate the device; and
    moving the device through the vessel cavity such that internal walls of the vessel cavity are reformed.

16. The method according to claim 15, further comprising engaging a driver to move the device through the vessel cavity.

17. The method according to claim 16, wherein the driver is a ram.

18. A method of reforming a vessel cavity with the device of claim 1, the method comprising:
    positioning the plurality of rollers proximate an opening of the vessel cavity;
    securing a stationary member to a distal portion of the vessel cavity;
    engaging the plurality of rollers with a rotational driving mechanism and a translational driving mechanism;
    securing the translational driving mechanism to the stationary member, wherein the translation driving mechanism is configured to move the plurality of rollers distally and proximally through the vessel cavity via engagement with the stationary member secured to the distal portion of the vessel cavity; and
    progressively moving the plurality of rollers through the vessel cavity with the translational driving mechanism while simultaneously rotating the plurality of rollers with the rotational driving mechanism such that internal walls of the vessel cavity are reformed.

19. The method according to claim 18, further comprising maintaining engagement of the plurality of rollers with the internal walls of the vessel cavity throughout translation of the plurality of rollers.

20. The method according to claim 18, wherein the progressively moving the plurality of rollers comprises repeatedly moving the plurality of rollers distally and proximally through the vessel cavity.

* * * * *